(12) United States Patent
Harrison et al.

(10) Patent No.: US 8,619,049 B2
(45) Date of Patent: Dec. 31, 2013

(54) MONITORING INTERACTIONS BETWEEN TWO OR MORE OBJECTS WITHIN AN ENVIRONMENT

(75) Inventors: Chris Harrison, Pittsburgh, PA (US); Hrvoje Benko, Seattle, WA (US); Andrew David Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 13/109,598

(22) Filed: May 17, 2011

(65) Prior Publication Data
US 2012/0293402 A1 Nov. 22, 2012

(51) Int. Cl.
*G06F 3/041* (2006.01)
(52) U.S. Cl.
USPC ............ 345/173; 345/156; 345/175; 345/7; 382/154
(58) Field of Classification Search
None
See application file for complete search history.

(56) References Cited

U.S. PATENT DOCUMENTS

| 8,289,316 | B1 | 10/2012 | Reisman et al. | |
|---|---|---|---|---|
| 2004/0012573 | A1 | 1/2004 | Morrison et al. | |
| 2004/0105573 | A1* | 6/2004 | Neumann et al. | 382/103 |
| 2008/0297482 | A1 | 12/2008 | Weiss | |
| 2008/0317331 | A1 | 12/2008 | Winn et al. | |
| 2009/0027337 | A1 | 1/2009 | Hildreth | |
| 2011/0080361 | A1 | 4/2011 | Miller et al. | |
| 2011/0205186 | A1 | 8/2011 | Newton et al. | |
| 2011/0205341 | A1 | 8/2011 | Wilson et al. | |
| 2012/0212509 | A1 | 8/2012 | Benko et al. | |

OTHER PUBLICATIONS

Chapanis, Alphonse. "Theory and Methods for Analyszing Errors in Man-Machine Systems.", Cited in Annals of the New York Academy of Science, vol. 51 Issue 7, Human Engineering. 1951. pp. 1179-1203.
Cao; et al., "Multi-User Interaction using Handheld Projectors"—Published Date: Oct. 7-10, 2007 http://www.dgp.toronto.edu/~ravin/papers/uist2007_multiuserhandheldprojector.pdf.
Wilson, Andrew D., "Depth-Sensing Video Cameras for 3D Tangible Tabletop Interaction"—Published Date: Oct. 10-12, 2007, http://ieeexplore.ieee.org/stamp/stamp.jsp?tp=&arnumber=4384131.
Blasko; et al., "Exploring Interaction with a Simulated Wrist-Worn Projection Display"—Published Date: 2005 http://www.cs.columbia.edu/~gblasko/Publications/Blasko_ISWC05.pdf.
Agarwal; et al., "High Precision Multi-touch Sensing on Surfaces using Overhead Cameras"—Published Date: 2007 http://research.microsoft.com/pubs/132550/cslate2.pdf.

(Continued)

*Primary Examiner* — Adam R Giesy
(74) *Attorney, Agent, or Firm* — Microsoft Corporation

(57) ABSTRACT

One or more techniques and/or systems are provided for monitoring interactions by an input object with an interactive interface projected onto an interface object. That is, an input object (e.g., a finger) and an interface object (e.g., a wall, a hand, a notepad, etc.) may be identified and tracked in real-time using depth data (e.g., depth data extracted from images captured by a depth camera). An interactive interface (e.g., a calculator, an email program, a keyboard, etc.) may be projected onto the interface object, such that the input object may be used to interact with the interactive interface. For example, the input object may be tracked to determine whether the input object is touching or hovering above the interface object and/or a projected portion of the interactive interface. If the input object is in a touch state, then a corresponding event associated with the interactive interface may be invoked.

20 Claims, 10 Drawing Sheets

(56) References Cited

OTHER PUBLICATIONS

Katz; et al., "A Multi-Touch Surface Using Multiple Cameras"—Published Date: 2007 http://wsnl.stanford.edu/papers/acivs07_hand.pdf.

Benko; et al., "DepthTouch: Using Depth-Sensing Camera to Enable Freehand Interactions On and Above the Interactive Surface"—Published Date: Oct. 1-3, 2008. http://research.microsoft.com/pubs/79848/DepthTouch_TR_final.pdf.

Olsen Jr.; et al., "Spilling: Expanding Hand held Interaction to Touch Table Displays"—Published Date: Oct. 10-12, 2007, http://ieeexplore.ieee.org/stamp/stamp.jsp?tp=&arnumber=4384125.

Virolainen; et al., "Projector-based Multi-touch Screen for Situated Interaction with a Mobile Phone"—Retrieved Date: May 2, 2011, http://www.mhci.uni-due.de/mp2/pdf/virolainen_mp2.pdf.

Argyros, A.A., and Lourakis, M.I.A. "Vision-based Interpretation of Hand Gestures for Remote Control of a Computer Mouse", In Proc. ECCV '06 Workshop on Computer Vision in HCI. LNCS 3979. 40-51, 2006 http://citeseerx.ist.psu.edu/viewdoc/download;jsessionid=DBE61F69B9D25C4007E901DEDD619474?doi=10.1.1.97.5376&rep=rep1&type=pdf.

Benko, H. Saponas, T.S., Morris, D., and Tan, D. "Enhancing Input on and Above the Interactive Surface with Muscle Sensing", In Proc. ITS '09. 93-100, Nov. 23-25, 2009, http://citeseerx.ist.psu.edu/viewdoc/download?doi=10.1.1.154.7143&rep=rep1&type=pdf.

Cao, X., and Balakrishnan, R. "Interacting with Dynamically Defined Information Spaces using a Handheld Projector and a Pen" In Proc. UIST '06. 225-234, Oct. 15-18, 2006 http://www.dgp.toronto.edu/papers/xcao_UIST2006.pdf.

DeMenthon D. and Davis, L.S. "Model-based Object Pose in 25 Lines of Cod", International Journal of Computer Vision, 15, (1995). 123-141. http://citeseerx.ist.psu.edu/viewdoc/download?doi=10.1.1.50.9280&rep=rep1&type=pdf.

Erol, A., Bebis, G., Nicolescu, M., Boyle, R.D., and Twombly, X. "Vision-based Hand Pose Estimation": A review. Computer Vision and Image Understanding. 108, (2007), 52-73. http://citeseerx.ist.psu.edu/viewdoc/download?doi=10.1.1.76.6351&rep=rep1&type=pdf.

Fitzmaurice, G. W. "Situated Information Spaces and Spatially Aware Palmtop Computers", Comm. of the ACM, 36, 7 (1993), 38-49. http://www.autodeskresearch.com/pdf/ChameleonSituatedInfoSpaces.pdf.

Gustafson, S., Bierwirth, D., and Baudisch, P. "Imaginary Interfaces: Spatial Interaction with Empty Hands and Without Visual Feedback" In Proc. UIST '10. 3-12, Oct. 3-6, 2010, http://www.seangustafson.com/static/papers/2010-UIST-Gustafson-ImaginaryInterfaces.pdf.

Harrison, C., Tan, D., and Morris, D. "Skinput: Appropriating the Body as an Input Surface", In Proc. CHI '10. 453-462 Apr. 10-15, 2010, http://dmrussell.net/CHI2010/docs/p453.pdf.

Holz, C. and Baudisch, P. "The Generalized Perceived Input Point Model and How to Double Touch Accuracy by Extracting Fingerprints", In Proc. CHI '10, 581-590, Apr. 10-15, 2010, http://dmrussell.net/CHI2010/docs/p581.pdf.

Holman, D. and Vertegaal, R. "Organic User Interfaces: Designing Computers in Any Way, Shape, or Form" Comm. of the ACM, 51, 6 (2008). 48-55. http://www.humanmedialab.org/files/communications%20of%20the%20acm%202008%20holman.pdf.

Hua, H., Brown, L., and Gao, C. Scape: "Supporting Stereoscopic Collaboration in Augmented and Projective Environments", IEEE Comput. Graph. Appl. 24, 1 (2004), 66-75. http://ieeexplore.ieee.org/stamp/stamp.jsp?tp=&arnumber=1255811.

Kane, S., Avrahami, D., Wobbrock, J., Harrison, B., Rea, A., Philipose, M. and LaMarca, A. "Bonfire: A Nomadic System for Hybrid Laptop-tabletop Interaction", In Proc. UIST'09. 129-138, Oct. 4-7, 2009 http://students.washington.edu/skane/pubs/uist09.pdf.

Lai, K., Bo, L., Ren, X., and Fox, D. "Sparse Distance Learning for Object Recognition Combining RGB and Depth Information", In Proc. ICRA '11 (2011) http://www.cs.washington.edu/ai/Mobile_Robotics/postscripts/sparse-distance-icra-11.pdf.

Lee, J.C., Hudson, S.E. and Tse, E. "Foldable Interactive Displays", In Proc. UIST '08. 287-290, Oct. 19-22, 2008, http://srl.csdl.tamu.edu/courses/CHI2009/papers/uist08/UIST08_34_Lee.pdf.

Lewis, R.J. "Literature Review of Touch-screen Research From 1980 to 1992", IBM Technical Report, 54.694. Aug. 20, 1993, http://drjim.0catch.com/touchtr.pdf.

"MicroVision, Inc.", Retrieved on-May 2, 2011, http://www.microvision.com.

Mistry, P., Maes, P., and Chang, L. "WUW—Wear Ur World: A Wearable Gestural Interface", In CHI '09 Ext. Abst. 4111-4116 (2009), http://dspace.mit.edu/openaccess-disseminate/1721.1/61366.

Park, Y. Han, S., Park, J. and Cho, Y. "Touch Key Design for Target Selection on a Mobile Phone", In Proc. MobileHCI '08. 423-426, Sep. 2-5, 2008, http://home.postech.ac.kr/~parkdog3/paper/IP02.pdf.

Pinhanez, C. S. "The Everywhere Displays Projector: A Device to Create Ubiquitous Graphical Interfaces", In Proc. UBICOMP '01. 315-331 (2001), http://researchweb.watson.ibm.com/ed/publications/ubicomp01.ps.

"PrimeSense Ltd", 2010, http://www.primesense.com.

Raskar, R., Beardsley, P., van Baar, J., Wang, Y., Dietz, P., Lee, J., Leigh, D., and Willwacher, T. "RFIG Lamps: Interacting with a Self-describing World via Photosensing Wireless Tags and Projectors", In Proc. SIGGRAPH '04. 406-415, Oct. 2004, http://www.merl.com/reports/docs/TR2004-062.pdf.

Saponas, T.S., Tan, D.S., Morris, D., Balakrishnan, R., Turner, J., and Landay, J. A. "Enabling Always-available Input with Muscle-computer Interfaces", In Proc. UIST '09. 167-176, Oct. 4-7, 2009 http://research.microsoft.com/en-us/um/people/ssaponas/publications/Saponas_EMG_UIST_2009.pdf.

Sears, A. "Improving Touchscreen Keyboards: Design Issues and a Comparison with Other Devices", IEEE Computer, 3 (1991), 253-269, Mar. 11, 1991 http://citeseer.ist.psu.edu/viewdoc/download?doi=10.1.1.29.1352&rep=rep1&type=pdf.

Starner, T., Auxier, J., Ashbrook, D., and Gandy, M. "The Gesture Pendant: A Self-illuminating, Wearable, Infrared Computer Vision System for Home Automation Control and Medical Monitoring", In Proc. ISWC '00, 87-94, http://smartech.gatech.edu/bitstream/handle/1853/29822/gesture_pendant.pdf?sequence=1.

Sturman, D.J. and Zeltzer, D. "A Survey of Glove-based Input", IEEE Comp Graph and Appl, 14, 1 (1994). 30-39, http://ieeexplore.ieee.org/stamp/stamp.jsp?tp=&arnumber=250916.

Tan, D., Morris, D., and Saponas, T.S. "Interfaces on the Go", ACM XRDS, 16, 4 (2010), 30-34, http://research.microsoft.com/en-us/um/people/desney/publications/XRDS2010-PhysioComputing.pdf.

Tomasi, C., Rafii, A. and Torunoglu, I. "Full-size Projection Keyboard for Handheld Devices", Comm. of the ACM, 46, 7 (2003), 70-75, http://0-cacm.acm.org.millennium.lib.cyut.edu.tw/magazines/2003/7/6773-full-size-projection-keyboard-for-handheld-devices/pdf.

Wang, F. and Ren, X. "Empirical Evaluation for Finger Input Properties in Multi-touch Interaction", In Proc. CHI '09. 1063-1072, Apr. 4-9, 2009, http://140.112.248.221/ebook/p1063-wang.pdf.

Ware, C., Arthur, K. and Booth, K.S. "Fish Tank Virtual Reality", In Proc. CHI '93. 37-42, Apr. 24-29, 1993 http://www.ccom-jhc.unh.edu/vislab/PDFs/FishTankVR.pdf.

Wilson, A. and Benko, H. "Combining Multiple Depth Cameras and Projectors for Interactions on, Above and Between Surfaces" In Proc. UIST '10. 273-282, Oct. 3-6, 2010, http://research.microsoft.com/en-us/um/people/awilson/publications/wilsonuist2010/wilson%20uist%202010%20lightspace.pdf.

Wilson, A.D. "PlayAnywhere: A Compact Interactive Tabletop Projection-vision System", In Proc. UIST '05. 83-92, Oct. 23-27, 2005, http://citeseerx.ist.psu.edu/viewdoc/download?doi=10.1.1.85.5334&rep=rep1&type=pdf.

Wilson, A.D. "Using a Depth Camera as a Touch Sensor", In Proc. ITS '10. 69-72, Nov. 7-10, 2010, http://research.microsoft.com/en-us/um/people/awilson/publications/wilsonits2010/wilsonits2010.pdf.

(56) References Cited

OTHER PUBLICATIONS

Yee, K. "Peephole Displays: Pen Interaction on Spatially Aware Handheld Computers", In Proc. CHI '03. 1-8. Apr. 5-10, 2003, http://people.ischool.berkeley.edu/~ping/peep/yee-peep-chi2003-paper.pdf.

Roudaut, A, Pohl, H. and Baudisch, P. "Touch input on curved surfaces" In Proc. CHI '11, May 7-12, 2011.

Takeoka, et al., "Z-touch: An Infrastructure for 3D Gesture Interaction in the Proximity of Tabletop Surfaces", In ACM International Conference on Interactive Tabletops and Surfaces, Nov. 7, 2010, pp. 91-94.

Korkalo, et al., "Construction and Evaluation of Multi-touch Screens Using Multiple Cameras Located on the Side of the Display", In ACM International Conference on Interactive Tabletops and Surfaces, Nov. 7, 2010, pp. 83-90.

* cited by examiner

MONITORING INTERACTIONS BETWEEN TWO OR MORE OBJECTS WITHIN AN ENVIRONMENT

BACKGROUND

Today, mobile devices are becoming increasingly connected, powerful, and versatile. Mobile devices are able to perform many tasks that previously required a personal computer for operation. Some features of mobile devices may comprise internet connectivity, email, video chat, gaming, GPS mapping, operating systems, etc. Mobile devices are generally designed for mobility so that a user can carry and interact with such devices in everyday situations (e.g., a smart phone may be designed to fit within a pocket, a tablet may be designed to be held in a single hand, etc.). Unfortunately, the limited size of mobile devices, such as diminutive screens and buttons, may mar the user experience. In one example, web pages may be redesigned with reduce content in order for the web pages to fit within the viewing confines of mobile devices. In another example, a user may be restricted to miniature input devices, such as small keyboards, for interacting with content on a mobile device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for monitoring interactions with a projected interactive interface are disclosed herein. In particular, an input object and an interface object may be identified and tracked in real-time within an environment. In one example, the input object and/or the interface object may be tangible objects within a physical environment (e.g., a finger input object and a notepad interface object within an outdoor or indoor space, such as a room). The input object and/or interface object may be tracked by iteratively indentifying such objects within the environment based upon depth data (e.g., depth data derived from depth based images of the environment successively captured by a depth camera). For example, the input object and/or interface object may be identified by calculating depth derivative characteristics derived from depth maps associated with captured images of the environment. That is, a depth camera may capture an image comprising depth measurements for pixels within the captured image, which may be represented as a depth map. Depth derivative characteristics may be calculated from the depth map by calculating the derivative change in depth between pixels and/or groups of pixels (e.g., an amount of change in depth between pixels), which may be used to create a depth derivative image. For example, a finger input object may be identified based upon depth derivative characteristics representing a cylindrical object having dimensional boundaries similar to a finger.

An interactive interface may be projected onto the interface object. It may be appreciated that the interactive interface may be associated with any one or more of a wide variety of interfaces, such as an email application, a calculator, a keyboard, a watch, a color pallet, a drawing surface, etc. It may be appreciated that the interface object may be associated with any one or more of a wide variety of tangible objects, such as a body part (e.g., a palm), a fixed surface in the environment (e.g., a wall), a hand-held object (e.g., a notepad), etc. In one example, the interactive interface may be projected onto the interface object using a projector, such as a pico projector. The projection may be dynamically adjusted in real-time based upon distortion of the interface object to provide a desired (e.g., optimal) viewpoint of the interactive interface (e.g., an interactive interface may be resized and/or repositioned based upon changes and/or movement of the interface object upon which the interactive interface is projected).

It may be appreciated that the input object and the interface object (and/or the interactive interface projected onto the interface object) may be tracked with respect to one another in real-time within the environment. In one example, the input object may be tracked to determine whether the input object is in a hover state or a touch state in relation to the interface object (and/or a portion of the projected interactive interface) based upon depth data (e.g., depth measurements, depth derivative characteristics, and/or other depth data). For example, a calculator interactive interface may be projected onto a left forearm interface object. The left forearm interface object and a right finger input object may be identified and/or tracked with respect to one another within the environment based upon depth data. The right finger input object may be determined to be in a hover state if the difference in depth between the right finger input object and the left forearm interface object is greater than a predetermined threshold. The right finger input object may be determined to be in a touch state if the difference in depth between the right finger input object and the left forearm interface object is less than a predetermined threshold. If the right finger input object is in a touch state, then a corresponding touch event may be invoked. For example, the touch state may indicate that the right finger input object is touching a sum button "+" on the calculator interactive interface projected onto the left forearm interface object. A touch event that displays a sum of two previously entered numbers may be calculated and/or displayed within a calculator display region of the calculator interactive interface object projected onto the left forearm interface object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
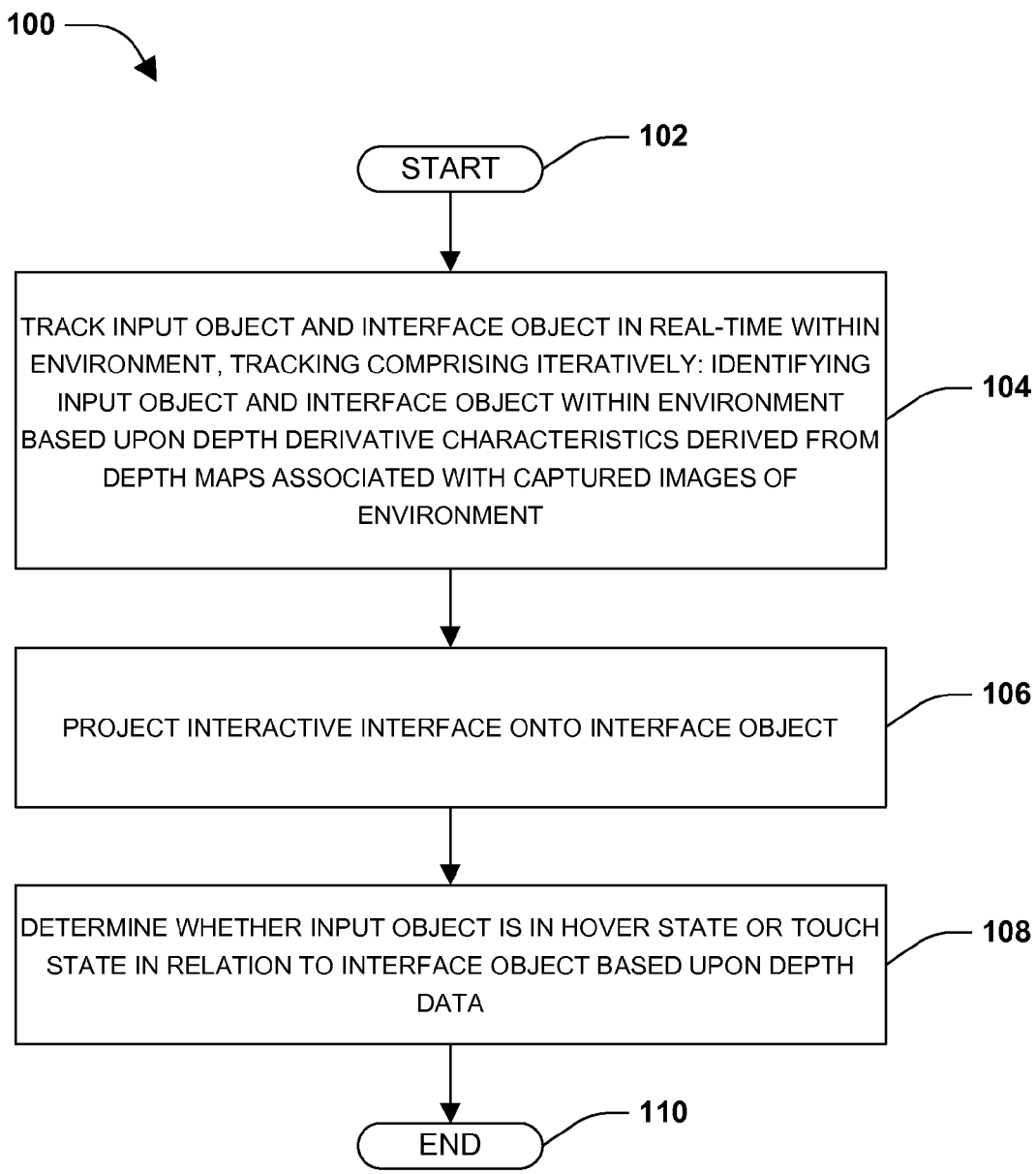
FIG. 1 is a flow chart illustrating an exemplary method of monitoring interactions with a projected interactive interface.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Due to the limited mobility of general computing devices and the constrained screen and input size of mobile devices, it may be advantageous to provide users with additional interfaces through which a user may interact with a computing environment. In particular, a user's environment may be augmented with a projection of an interactive interface that may be used to interact with a computing environment. For example, an email interactive interface may be projected onto a surface (e.g., a hand, a wall, a tree, etc.), such that a user may read emails by interacting with the projection of the email application interface. Unfortunately, it may be difficult to monitor interactions of an input device (e.g., a fingertip) with an interactive interface projected onto an interface object due to limited information and/or feedback of the environment, input device, and/or interface object. For example, one current solution measures mechanical energy and/or sound waves created by impact of a finger on a surface. However, such a technique may be unable to detect whether the finger is moved along the surface, such as to create a finger stroke.

Accordingly, one or more systems and/or techniques for monitoring interactions with a projected interactive interface are provided herein. In particular, an input object and an interface object upon which an interactive interface may be projected may be tracked in real-time within an environment based upon depth data (e.g., depth measurements and/or calculated depth derivative data associated with images captured by a depth camera). Interactions, such as hovering over and/or touching, between the input object and the interface object may be tracked based upon such depth data. In this way, a user may interact with a computing environment through the interactive interface (e.g., a calculator) projected onto the interface object (e.g., a wall) using the input object (e.g., a finger) based upon depth data, which may be derived from images captured by a depth camera, for example. The user may appropriate a wide variety of surfaces as the interface object upon which the interactive interface may be projected (e.g., a wall, a palm, a door, etc.). For example, a user may invoke and/or define an interface object using a hand gesture. The projection of the interactive interface on the interface object may be tracked and/or dynamically adjusted based upon distortion, such as movement, of the interface object (e.g., a projection of an email application on a notepad interface object may be altered based upon a user moving or twisting the notepad interface object).

One embodiment of monitoring interactions with a projected interactive interface is illustrated by an exemplary method 100 in FIG. 1. At 102, the method starts. At 104, an input object and/or an interface object may be tracked in real-time within an environment. The tracking may comprise iteratively identifying the input object and interface object within the environment based upon depth derivative characteristics derived from depth maps associated with captured images of the environment. For example, a depth camera (e.g., a depth camera worn by a user) may be configured to capture images of the environment, along with depth data (e.g., depth data for respective pixels of an image), which may be used to generate depth maps of the environment. It may be appreciated that a wide variety of depth sensing techniques may be used to generate the depth map, such as LIDAR, time of flight, structured light techniques, and/or other depth sensing techniques. Depth derivatives (e.g., change in depth) may be calculated from the depth maps to indentify the input object and/or the interface object. In particular, the depth derivatives may be analyzed to identify clusters of pixels having depth derivative characteristics illustrative of input objects and/or interface objects. In one example, segmentation may be performed to identify the input object, which may yield spatial location (X, Y, and Z coordinates) of the input object (e.g., the input object may be segmented from other objects within the environment based upon depth data).

In one example of identifying an input object, a cylindrical input object may be identified based upon depth derivatives (changes in depth within the environment) illustrative of a cylindrical object having particular depth derivative characteristics. For example, a vertical cylinder may have depth derivative characteristics of a smooth derivative indicating small or no change in depth for an area to the left of the cylinder, then a steep positive derivative indicating a significant increasing change in depth for a curved left portion of the cylinder, then a smooth derivative indicating small or no change in depth for the top of the cylinder, then a steep negative derivative indicating a significant decreasing change in depth for a curved right portion of the cylinder, and finally a smooth derivative indicating small or no change in depth for an area to the right of the cylinder. In this way, a wide variety of input objects with various shapes having corresponding depth derivative characteristics may be identified.

At 106, an interactive interface may be projected onto the interface object. In one example, a fixed-sized interactive interface may be projected at a fixed projection location (e.g., a center of a projection area on the interface object), such that the interface object would have to be positioned into the fixed projection location. In another example, an X/Y/Z location and orientation of the interface object may be determined so that the projection of the interactive interface may track the interface object. In another example, depth, size, and/or other measurement data of the interface object may be used to classify the interface object as a particular predefined type of surface (e.g., depth, size, and/or dimensional ranges may be predefined for various surfaces, which may be compared with measured data of the interface object to classify the interface object). In another example, the projection of the interactive interface may be automatically sized and/or positioned (e.g., auto-fitting) based upon available surface area detected on a segmented surface of the interface object. For example, X/Y/Z rotation estimates may be used to determine outermost points of the interface object's surface along major and minor axes, radiating out from the surface's central lock point, which may result in four lock points that may be used to estimate length and width of the interface object. In another example, a hybrid approach blending interface object classification and/or auto-fitting may be used. In another example, a user may define a projection area on the interface object upon which the interactive interface may be projected. For example, the user may click a center point and/or may drag a boundary outlining the projection area. It may be appreciated that a variety of projection and/or projection tracking techniques may be employed for projecting the interactive interface onto the interface object.

At 108, the input object may be determined as being in a hover state or a touch state in relation to the interface object based upon depth data. That is, an X, Y, and Z position of the input object in relation to the interface object may be resolved in order to determine whether the input object is hovering above or touching the interface object (e.g., a portion of the interface object upon which (a portion of) the interactive interface is projected). In one example, the input object depicted within a depth map of the environment may be flood filled based upon depth values to determine whether the input object is in a hover state or a touch state. That is, pixels comprising similar depth values may be "flood filled" from the input object outward. If the flood filling fills at least a portion (e.g., a predefined percentage) of the interface object (e.g., because pixels within the interface object have similar depth values as pixels within the input object), then the input object may be determined as being in a touch state with regard to the interface object because of the similar depth values of the input object and the interface object. Additionally, if the touch location corresponds to a projected portion of the interactive interface, then an event associated with the (touched portion of the) interactive interface may be performed. However, if the flood filling does not fill at least a portion (e.g., a predefined percentage) of the interface object (because pixels within the interface object do not have similar depth values as pixels within the input object), then the input object may be determined as being in a hover state with regard to the interface object because of the dissimilar depth values of the input object and the interface object. At 110, the method ends.

Figure 2:
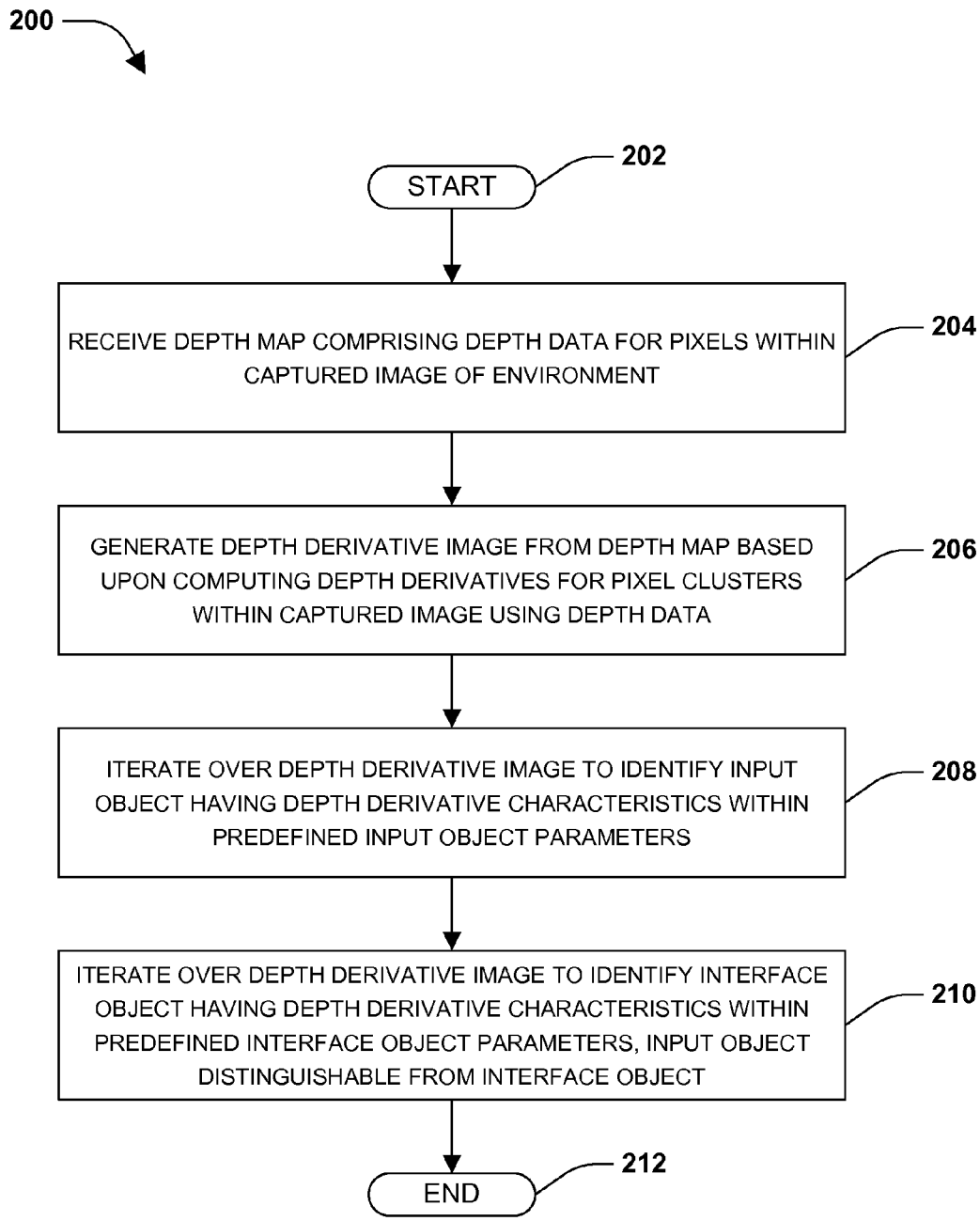
FIG. 2 is a flow chart illustrating an exemplary method of monitoring interactions between an input object and an interface object.

One embodiment of monitoring interactions between an input object and an interface object is illustrated by an exemplary method 200 in FIG. 2. At 202, the method starts. At 204, a depth map comprising depth data for pixels within a captured image of an environment may be received. At 206, a depth derivative image may be generated from the depth map based upon computing depth derivatives for pixel clusters within the captured image using the depth data. That is, depth derivatives may be calculated in the X- and Y-axes for pixel clusters (e.g., a sliding 5×5 pixel window). The depth derivative image may be iterated over to identify an input object and/or an interface object. For example, template matching with dynamic parameters may be used to identify groupings of pixels that may be candidates for input objects and/or interface objects.

At 208, the depth derivative image may be iterated over to identify an input object having depth derivative characteristics within predefined input object parameters. That is, predefined input object parameters may be predefined (e.g., as predefined templates) for various input objects that may be identified and/or tracked within an environment (e.g., a predefined template for a finger may be defined with input object parameters comprising a height range of 5 mm to 25 mm representing a typical finger diameter; a predefined template for a stylus may be defined with input object parameters typical of a stylus; etc.). A grouping of pixels may be identified as an input object candidate based upon the grouping of pixels comprising depth derivative characteristics within predefined input object parameters (e.g., vertical slices of cylinder-like objects may be identified as candidates for a finger input object). In this way, an input object may be identified based upon depth data, such as depth derivative characteristics and/or other depth information.

At 210, the depth derivative image may be iterated over to identify an interface object having depth derivative characteristics within predefined interface object parameters. It may be appreciated that the input object and the interface object may be distinguishable from one another, and thus may be identified and/or tracked in real-time within the environment with relation to one another (e.g., the input object may be in a hover state or a touch state in relation to the interface object, the input object may be used to create a stroke input across the interface object, etc.). In particular, the input object and the interface object may be tracked in real-time within the environment by iteratively receiving depth maps comprising depth data for pixels within captured images of the environment, generating depth derivative images from the depth maps, and distinguishing between the input object and the interface object based upon depth data.

In one example, an interactive interface may be projected onto the interface object so that a user may interact with the interactive interface using the input object. The projection of the interactive interface may be dynamically adjusted (e.g., resized, moved, etc.) based upon distortion (e.g., movement) of the interface object, which may be detected from depth data associated with the interface object (e.g., depth data of a hand interface object may indicate that the hand moved to the right). In this way, interactions with the interactive interface may be monitored by tracking interactions of the input object with the interface object (e.g., the input object may touch a portion of the interface object upon which the interactive interface is projected, which may invoke a corresponding event associated with the interactive interface).

It another example, the input object and/or the interface object may be identified and/or tracked within the environment without reference or regard to an interactive interface and/or a projection thereof (e.g., a projected interface object may or may not be utilized when tracking input objects and/or interface objects). That is, the input object and the interface object may be tracked merely with respect to one another within the environment without having a projected interactive interface. For example, a finger may be identified as a finger input object, while a forearm may be identified as a forearm interface object. A user may enter a text message into a tangible computing device (e.g., a watch, cell phone, etc.) by "writing" the text message on the forearm interface object using the finger input object, which may be tracked as one or more touch states and/or one or more hover states between the finger input device and the forearm interface object. In this example, a projected interactive interface is not utilized (e.g., there is no projection of a text entry interactive interface on the forearm interface object). Thus, the user performs the text message entry by merely "writing" on a bare surface of the forearm (and, of course, other surfaces could be used).

Various states of the input object in relation to the interface object may be tracked based upon depth data (e.g., a flood filling technique based upon depth data may be used to determine whether the input object is touching or hovering above the interface object). For example, an input object may be in a hover state, a touch state, a touch state indicative of a stroke input, and/or a variety of other states in relation to the interface object. If the input object is in a touch state, then a corresponding touch event may be invoked. For example, if the input object is determined to be in a touch state in relation to the interface object at a location upon which the interactive interface is projected (e.g., a finger input object is touching an "s" key of a keyboard interactive interface projected onto a hand interface object), then an event corresponding to the interactive interface may be invoked (e.g., an "s" may be displayed in a projected text editing application associated with the projected keyboard interactive interface). Additionally, the projection of the interactive interface may be altered to provide real-time feedback (e.g., the "s" key of the keyboard interactive interface may be darkened, lightened, discolored, etc. to provide feedback that the "s" key was touched). If the input object is in a hover state (e.g., for X time), then a corresponding hover event may be invoked (e.g., an event corresponding to an interactive interface).

It may be appreciated that one or more input objects and/or one or more interface objects may be tracked within the environment. In one example, the depth derivative image may be iterated over to identify a second interface object (e.g., the first interface object may be a hand upon which a color pallet is projected, and the second interface object may be a wall upon which a drawing application is projected). A determination may be made as to whether the input object is in a hover state or a touch state in relation to the second interface object (e.g., a finger input object may be used to select a color from the color pallet projected on the first interface object, and then the finger input object may used to draw an image within the drawing application projected on the second interface object). In another example, the depth derivative image may be iterated over to identify a second input object (e.g., a first input object may be an index finger, and a second input object may be a pointer finger). A determination may be made as to whether the second input object is in a hover state or a touch state in relation to the interface object (e.g., the index finger may be used to invoke a shift key of a keyboard interactive interface projected onto a wall interface object, and the pointer finger may be used to invoke an "s" key of the keyboard interactive interface to create a capital S). At 212, the method ends.

Figure 3:
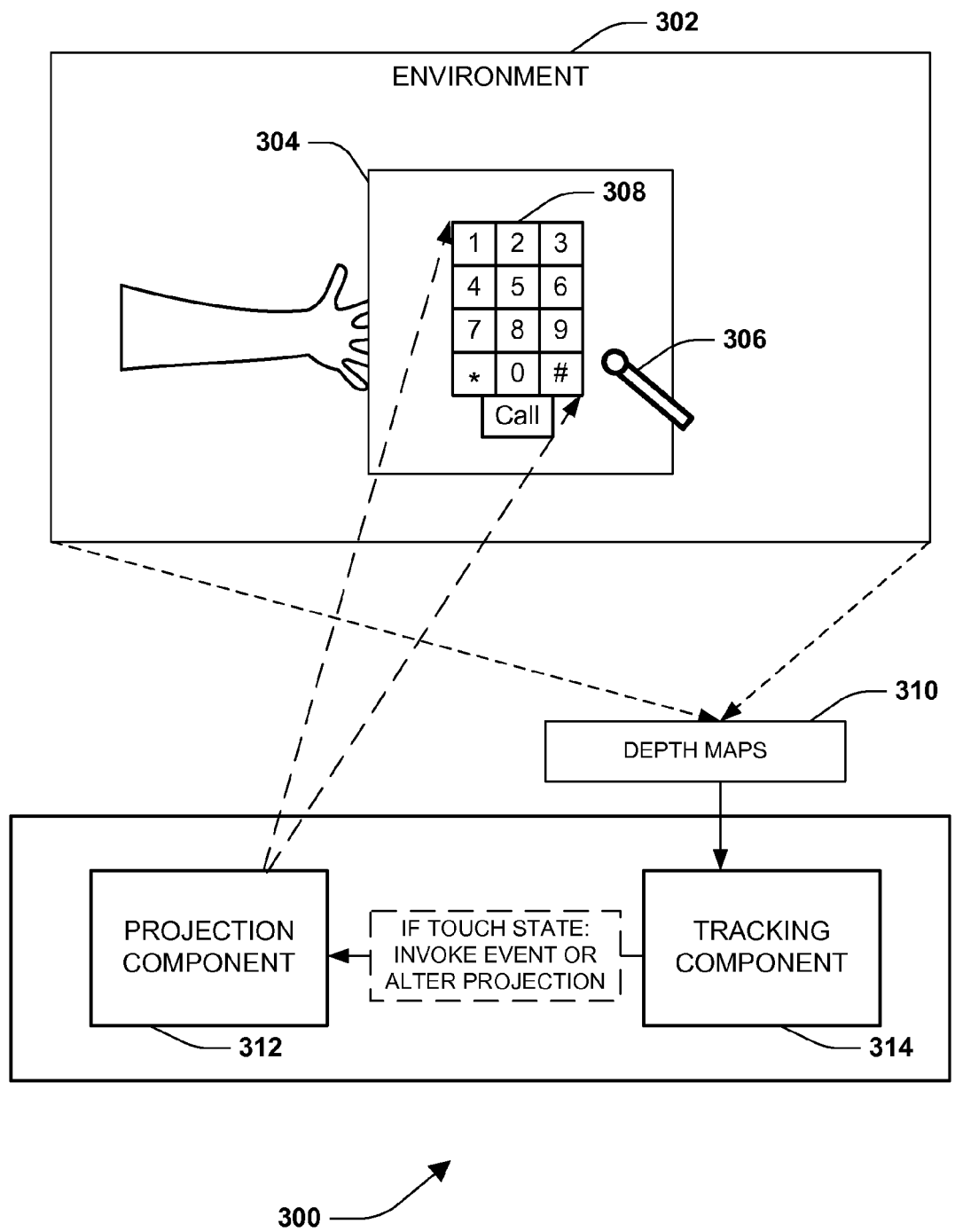
FIG. 3 is a component block diagram illustrating an exemplary system for monitoring interactions between an input object and an interface object.

FIG. 3 illustrates an example of a system 300 configured to monitor interactions between an input object and an interface object. System 300 may comprise a projection component 312 and/or a tracking component 314. The tracking component 314 may be configured to track an input object 306 (e.g., a stylus input object) and/or an interface object 304 (e.g., a notepad interface object) within an environment 302 (e.g., a room) by iteratively identifying the input object 306 and/or the interface object 304 within the environment 302 based upon depth derivative characteristics derived from depth maps 310 associated with captured images of the environment 302. In one example, a depth camera may capture images of the environment 302, which may be used as depth maps 310 comprising depth values for respective pixels of captured images. A depth derivative image may be generated from a depth map based upon computing depth derivatives for pixel clusters within a captured image using depth data of the depth map. The depth derivative image may be used to identify and/or track the input object 306 and the interface object 304. In one example, the tracking component 314 may be configured to identify the interface object based at least in part upon a user hand gesture defining an interface area (e.g., a user may draw a box interface area upon a wall to define a box interface object on the wall).

The projection component 312 may be configured to project an interactive interface 308 (e.g., a calculator) onto the interface object 304. The projection component 312 may be configured to dynamically adjust the projection of the interactive interface 308 based upon distortion of the interface object 304 detected from depth data associated with the interface object 304 (e.g., a user may twist or move the notepad interface object, and thus the projection of the calculator may be adjusted accordingly to provide desired (e.g., optimal) viewing; the user may tile the notepad interface object to indicate a desire for privacy, and thus the projection of the calculator may be dimmed or shrunken to provide privacy).

The tracking component 314 may be configured to determine whether the input object 306 is in a hover state or a touch state (or a touch state indicating a stroke input) in relation to the interface object 304 based upon depth data (e.g., depth values, depth derivative values, etc.). For example, the input object 306 may be flood filled within the depth derivative image (and/or a captured image and/or a depth map) based upon depth data (e.g., pixels having similar depth values may be "filled" from a starting point within the input object 306, whereas pixels with dissimilar depth values may not be "filled"). In this way, the input object 306 may be determined as being in a touch state in relation to the interface object 304 (and potentially in a touch state in relation to a portion of the interactive interface 308 projected onto the touched area) based upon the flood filling at least a portion of the interface object.

It may be appreciated that the input object 306 may be determined as being in particular state, such as a touch state or a hover state, in relation to the interactive interface 308 projected onto the interface object 304. For example, the input object 306 may be detected as being in a touch state in relation to the interface object 304 at a location upon which the interactive interface 308 is projected. Upon detecting the touch state, an event corresponding to the interactive interface 308 may be invoked (e.g., a call may be placed based upon detecting the input object 306 touched a "call" button on the interactive interface 308). Additionally, the projection of the interactive interface 308 may be altered to provide real-time feedback (e.g., the "call" button may be highlighted to provide feedback that the "call" button was touched and/or invoked).

Figure 4A:
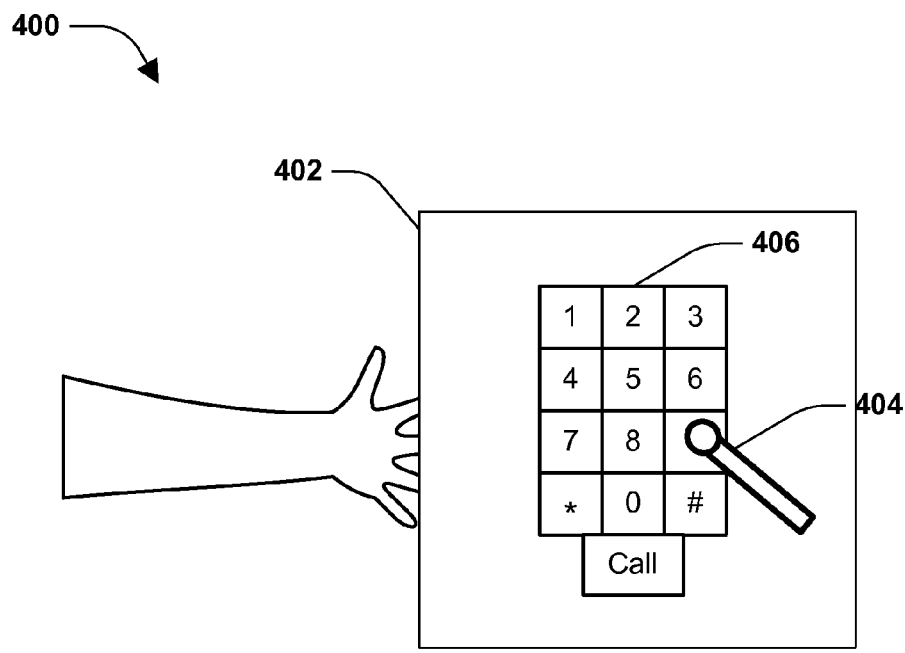
FIG. 4A is an illustration of an example of a stylus input object in a hover state with respect to a phone interactive interface projected onto a notepad interface object.

FIG. 4A illustrates an example 400 of a stylus input object 404 in a hover state with respect to a phone interactive interface 406 projected onto a notepad interface object 402. The stylus input object 404 and notepad interface object 402 may be identified and/or tracked within an environment with respect to one another. The phone interactive interface 406 may be projected onto the notepad interface object 402, such that a user may interact with the phone interactive interface 406 using the stylus input object 404. In one example, the stylus input object 404 may be determined to be in a hover state with respect to the notepad interface object 402 based upon depth data (e.g., depth values of the stylus input object 404 may be dissimilar from depth values of the notepad interface object 402). Additionally, the stylus input object 404 may be determined to be in a hover state with respect to the phone interactive interface 406 (e.g., the stylus input object 404 may be determined to be hovering over a projection of the "9" button).

Figure 4B:
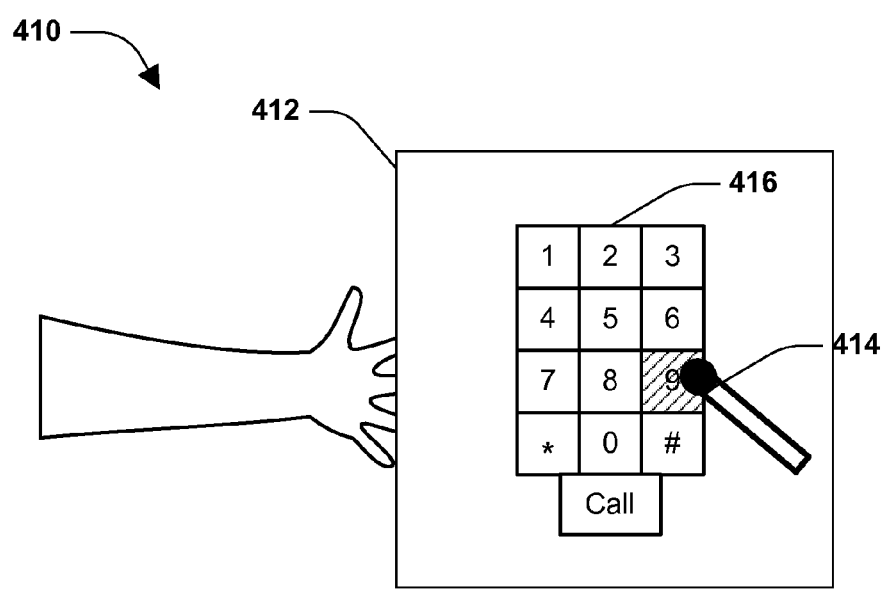
FIG. 4B is an illustration of an example of a stylus input object in a touch state with respect to a phone interactive interface projected onto a notepad interface object.

FIG. 4B illustrates an example 410 of a stylus input object 414 in a touch state with respect to a phone interactive interface 416 projected onto a notepad interface object 412. The stylus input object 414 and notepad interface object 412 may be identified and/or tracked within an environment with respect to one another. The phone interactive interface 416 may be projected onto the notepad interface object 412, such that a user may interact with the phone interactive interface 416 using the stylus input object 414. In one example, the stylus input object 414 may be determined to be in a touch state with respect to the notepad interface object 412 based upon depth data (e.g., depth values of the stylus input object 414 may be similar to depth values of the notepad interface object 412). Additionally, the stylus input object 414 may be determined to be in a touch state with respect to the phone interactive interface 416 (e.g., the stylus input object 414 may be determined as touching a projection of the "9" button). In one example, an event corresponding to the touch state may be invoked (e.g., the number "9" may be dialed within a phone application associated with the phone interactive interface 416 and/or the number "9" may be projected onto the interface object 412 within a dialing text box). In another example, the projection of the phone interactive interface 416 may be altered (e.g., the "9" button may be shaded grey to provide feedback that the number "9" was dialed).

Figure 5:
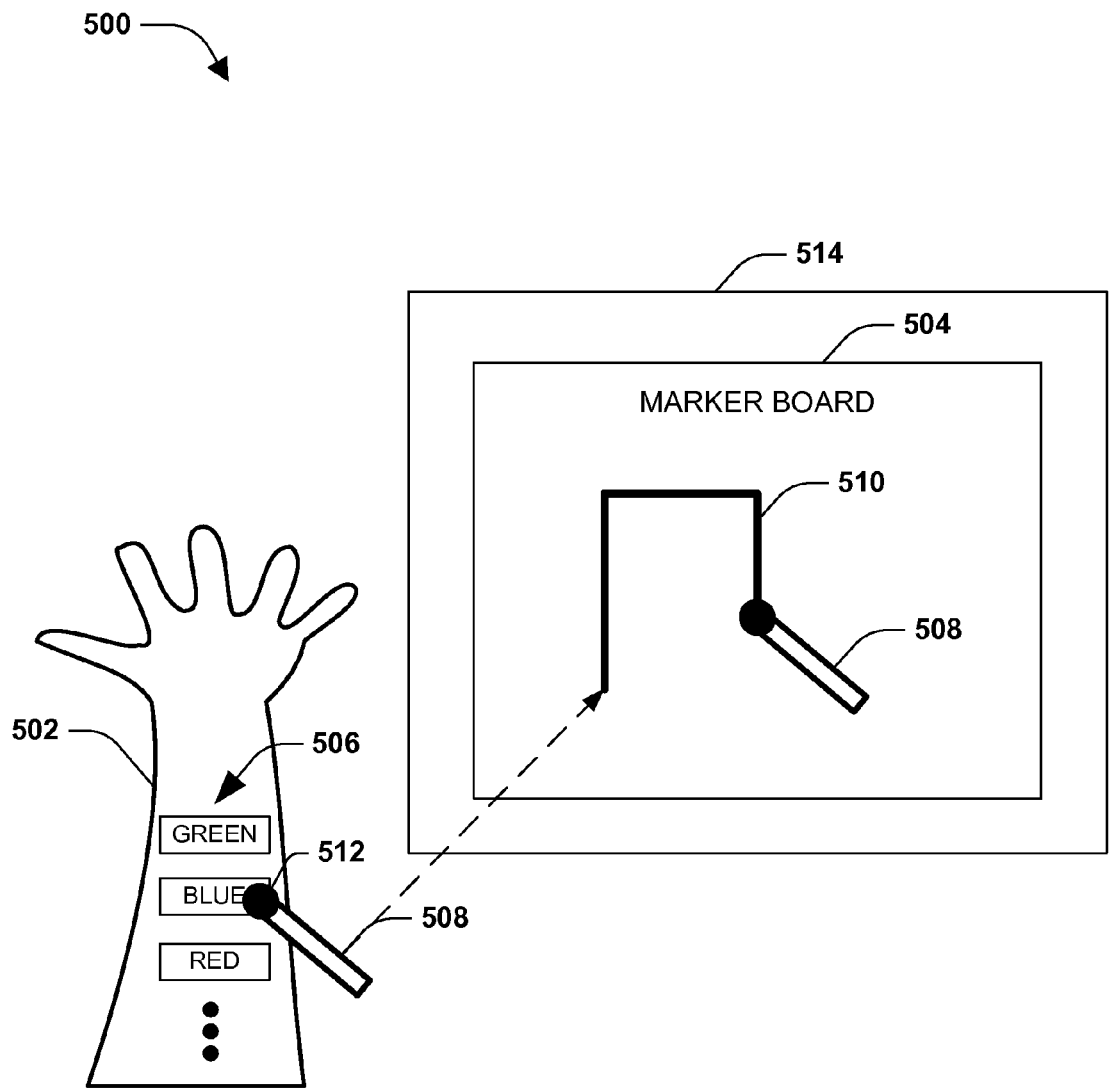
FIG. 5 is an illustration of an example of monitoring a touch input on a color selection interactive interface projected onto a hand interface object, and then a stroke input on a marker board interactive interface projected onto a wall interface object.

FIG. 5 illustrates an example 500 of monitoring a touch input 512 on a color selection interactive interface 506 projected onto a hand interface object 502, and then a stroke input 510 on a marker board interactive interface 504 projected onto a wall interface object 514. A stylus input object 508, the hand interface object 502, and/or the wall interface object 514 may be identified and/or tracked within an environment with respect to one another. The color selection interactive interface 506 may be projected onto the hand interface object 502, and the marker board interactive interface 504 may be projected onto the wall interface object 514. In this way, interactions between the stylus input object 508 and the color selection interactive interface 506 and/or the marker board interactive interface 504 may be monitored (e.g., touch input 512, stroke input 510, etc.).

In one example, the stylus input object 508 may be determined to be in a touch state (touch input 512) with regard to the hand interface object 502 and/or a "blue selection" button of the color selection interactive interface 506. Accordingly, a color selection event may be invoked based upon the touch input 512 (e.g., a drawing color of the marker board interactive interface 504 may be set to blue). Next, the stylus input object 508 may be determined to be in a touch state (stroke input 510) with regard to the wall interface object 514 and/or portions of the marker board interactive interface object 504. Accordingly, a draw event may be invoked based upon the stroke input 510 (e.g., a blue line may be projected onto the wall interface object 514).

Figure 6A:
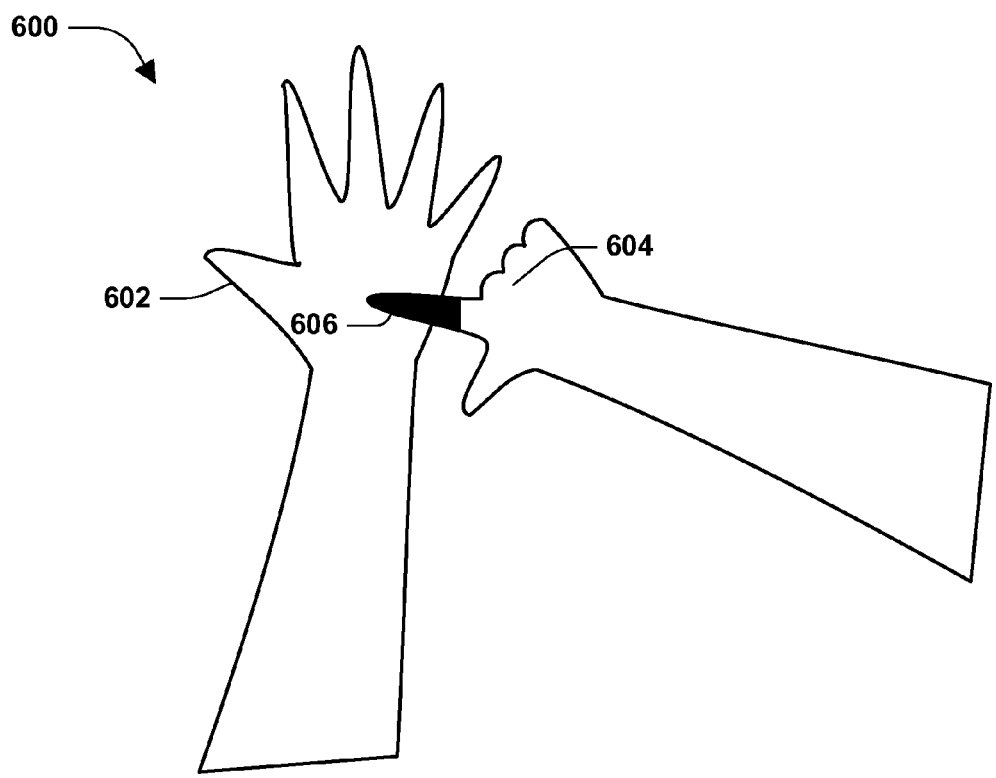
FIG. 6A is an illustration of an example of a finger input object in a hover state.

FIG. 6A illustrates an example 600 of a finger input object 604 in a hover state 606. The finger input object 604 may be indentified and tracked as an input object within an environment. Similarly, a palm interface object 602 may be indentified and tracked as an interface object within the environment. The palm interface object 602 and the finger input object 604 may be tracked with respect to one another in the environment. In one example, the finger input object 604 (e.g., a cluster of pixels representing the finger input object 604 within a capture image) may be flood filled based upon depth data to determine whether the finger input object 604 is in a touch state or a hover state (e.g., hover state 606). In particular, starting within the finger input object 604, pixels having similar depth values may be filled. If a predetermined percentage of pixels representing the palm interface object 602 are not filled because such pixels have dissimilar depth values, then the finger input object 604 may be determined to be in the hover state 606 with respect to the palm interface object 602 (e.g., the finger input object 604 may be determined as hovering above the palm interface object 602 based upon the difference in depth between the finger input object 604 and the palm interface object 602).

Figure 6B:
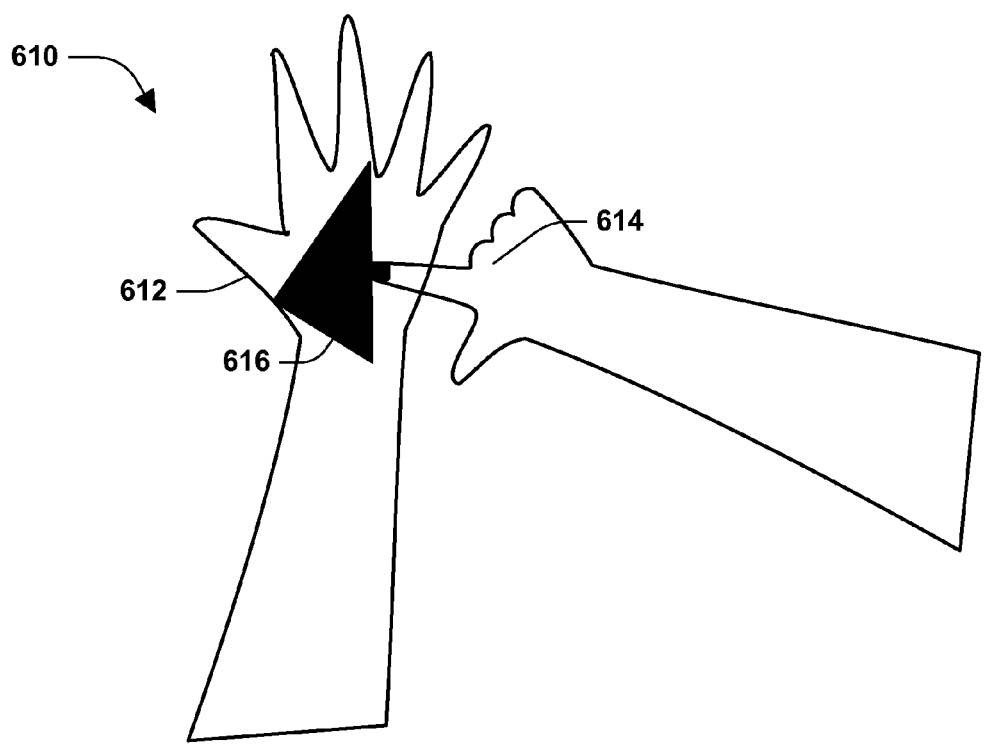
FIG. 6B is an illustration of an example of a finger input object in a touch state.

FIG. 6B illustrates an example 610 of a finger input object 614 in a touch state 616. The finger input object 614 may be indentified and tracked as an input object within an environment. Similarly, a palm interface object 612 may be indentified and tracked as an interface object within the environment. The palm interface object 612 and the finger input object 614 may be tracked with respect to one another in the environment. In one example, the finger input object 614 (e.g., a cluster of pixels representing the finger input object 604 within a capture image) may be flood filled based upon depth data to determine whether the finger input object 614 is in a touch state (e.g., touch state 616) or a hover state. In particular, starting within the finger input object 614, pixels having similar depth values may be filled. If at least a portion of pixels (e.g., a predetermined percentage of pixels) are filled, then the finger input object 614 may be determined to be in a touch state 616 with respect to the palm interface object 612 (e.g., flooding filling may attempt to fill as many pixels as possible from the finger input object 614 into the palm interface object 612, such that if a predetermined percentage is filled, then the finger input object 614 and the palm interface object 612 are treated as merged, such as touching). In this way, a touch event may be invoked based upon the touch state 616 (e.g., an event associated with an interactive interface projected onto the palm interface object 612 may be invoked).

Figure 7:
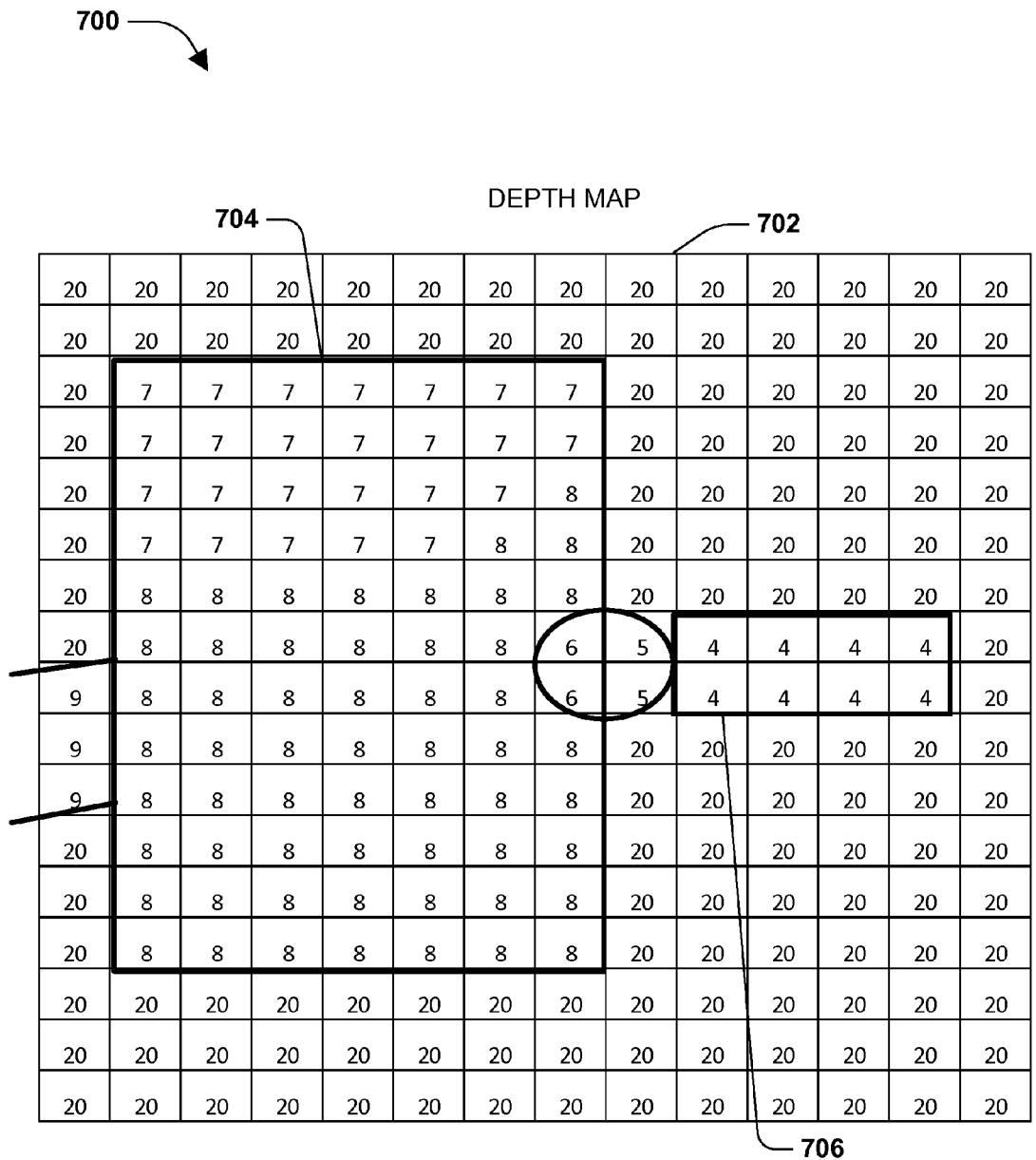
FIG. 7 is an illustration of an example of a depth map associated with a stylus input object in a hover state with regard to a notepad interface object.

FIG. 7 illustrates an example 700 of a depth map 702 associated with a stylus input object 706 in a hover state with regard to a notepad interface object 704. The depth map 702 may correspond to a captured image of an environment (e.g., a room with a user holding a notepad and a stylus). The depth map 702 may comprise depth data for respective pixels within the captured image (e.g., a depth of 20 units, a depth of 7 units, a depth of 6 units, etc.). The stylus input object 706 and/or the notepad interface object 704 may be identified and/or tracked based upon depth data within the depth map 702 and/or other depth maps not illustrated (e.g., depth map 802 of FIG. 8). In one example, a cluster of pixels comprising depth values around 7 to 8 units may be identified as the notepad interface object 704, while a cluster of pixels comprising depth values around 4 to 6 units may be identified as the stylus input object 706 (pixels with depth values beyond 15 units may be disregarded as background). It may be appreciated that depth values of the notepad interface object 704 and/or the stylus input object 706 may change from depth map to depth map as the objects are moved around within the environment over time, and thus tracking of the objects may take into account such changes.

The stylus input object 706 may be determined to be in a hover state with respect to the notepad interface object 704 because depth values of the stylus input object 706 (e.g., depth values of 4 to 6) are dissimilar from depth values of the notepad interface object 704 (e.g., depth value of 8 for pixels within the notepad interface object 704 that are near to the stylus input object 706).

Figure 8:
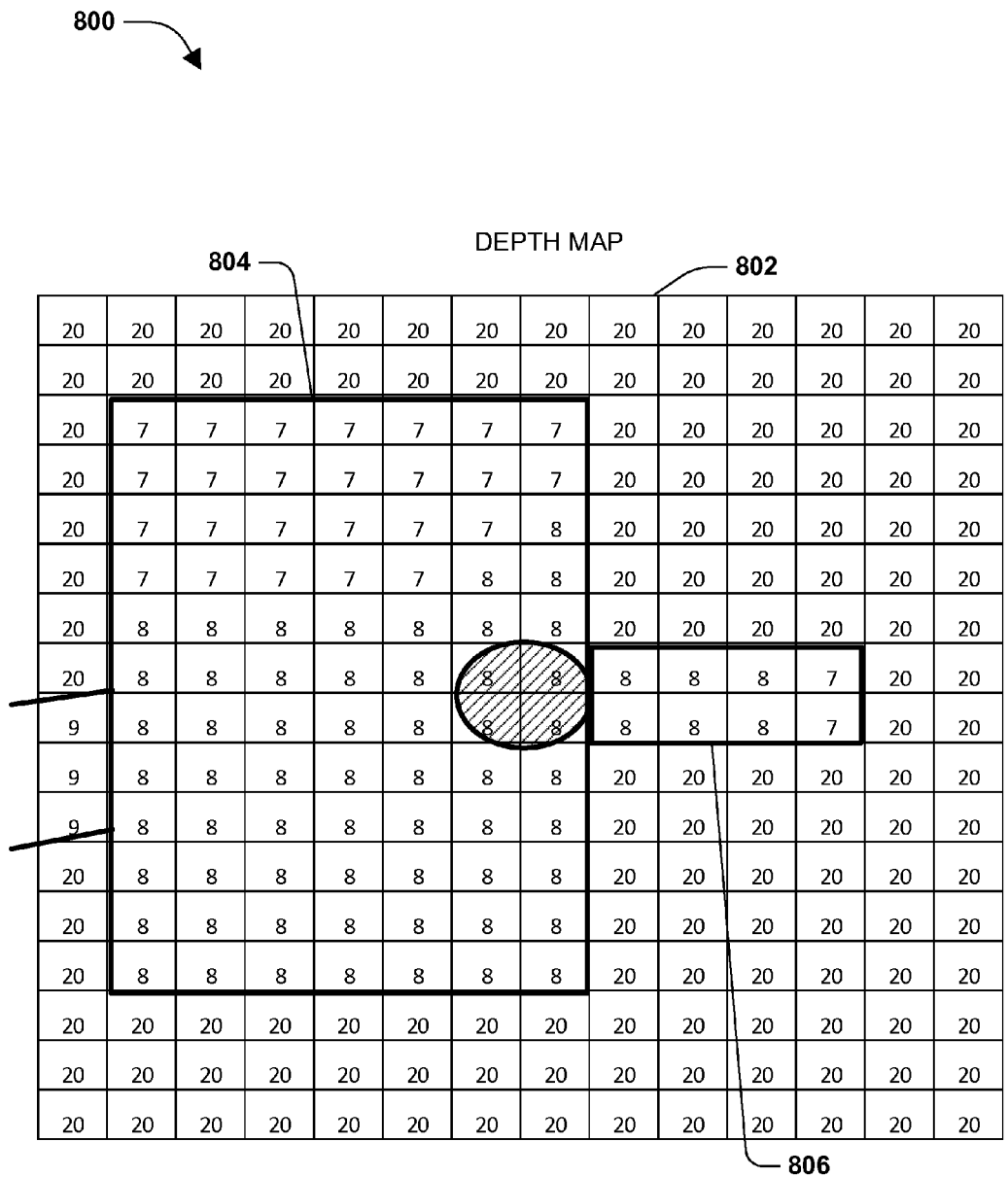
FIG. 8 is an illustration of an example of a depth map associated with a stylus input object in a touch state with regard to a notepad interface object.

FIG. 8 illustrates an example 800 of a depth map 802 associated with a stylus input object 806 in a touch state with regard to a notepad interface object 804. The depth map 802 may correspond to a captured image of an environment (e.g., a room with a user holding a notepad and a stylus). The depth map 802 may comprise depth data for respective pixels within the captured image. The stylus input object 806 and/or the notepad interface object 804 may be identified and/or tracked based upon depth data within the depth map 802 and/or other depth maps not illustrated (e.g., depth map 702 of FIG. 7). In one example, a cluster of pixels comprising depth values around 7 to 8 units may be identified as the notepad interface object 804, while a cluster of pixels comprising depth values around 7 to 8 units may be identified as the stylus input object 806. It may be appreciated that other considerations may be taken into account when determining the state of the stylus input object 806 with respect to the notepad interface object 804. For example, features (e.g., detected visual features, predefined features associated with the type of input object and/or interface object, and/or other observed data) may be used to identify and/or track the state of the stylus input object 806 with respect to the notepad interface object 804. It may be appreciated that depth values of the notepad interface object 804 and/or the stylus input object 806 may change from depth map to depth map as the objects are moved around within the environment over time, and thus tracking of the objects may take into account such changes.

The stylus input object 806 may be determined to be in a touch state with respect to the notepad interface object 804 because depth values of the stylus input object 806 (e.g., depth values of 7 to 8) are similar to depth values of the notepad interface object 804 (e.g., depth value of 8 for pixels within the notepad interface object 804 that are near to the stylus input object 806).

Figure 9:
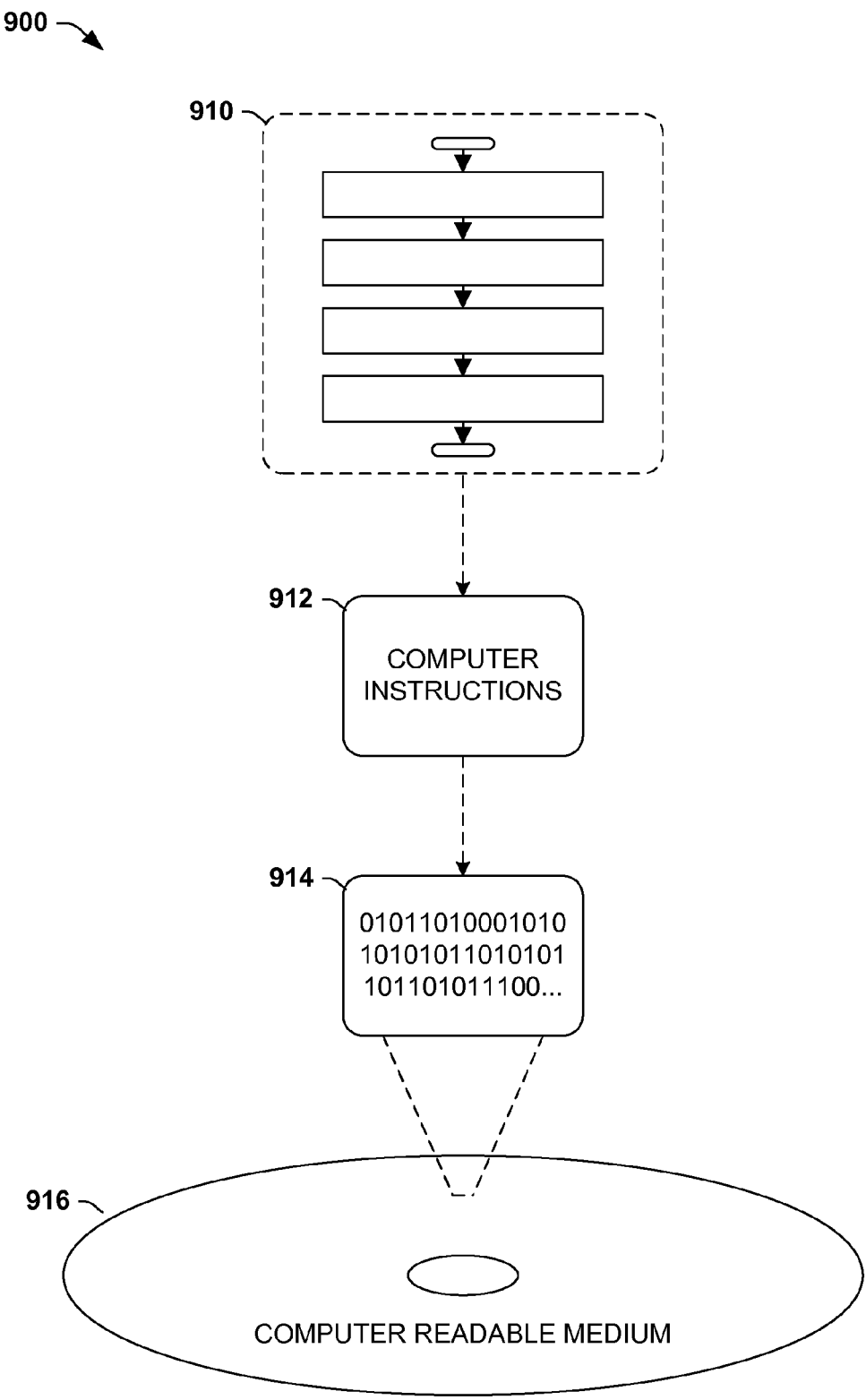
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 100 of FIG. 1 and/or at least some of exemplary method 200 of FIG. 2, for example. In another such embodiment, the processor-executable instructions 912 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

It may be appreciated that at least one of A and B and/or the like generally means A or B or both A and B.

Figure 10:
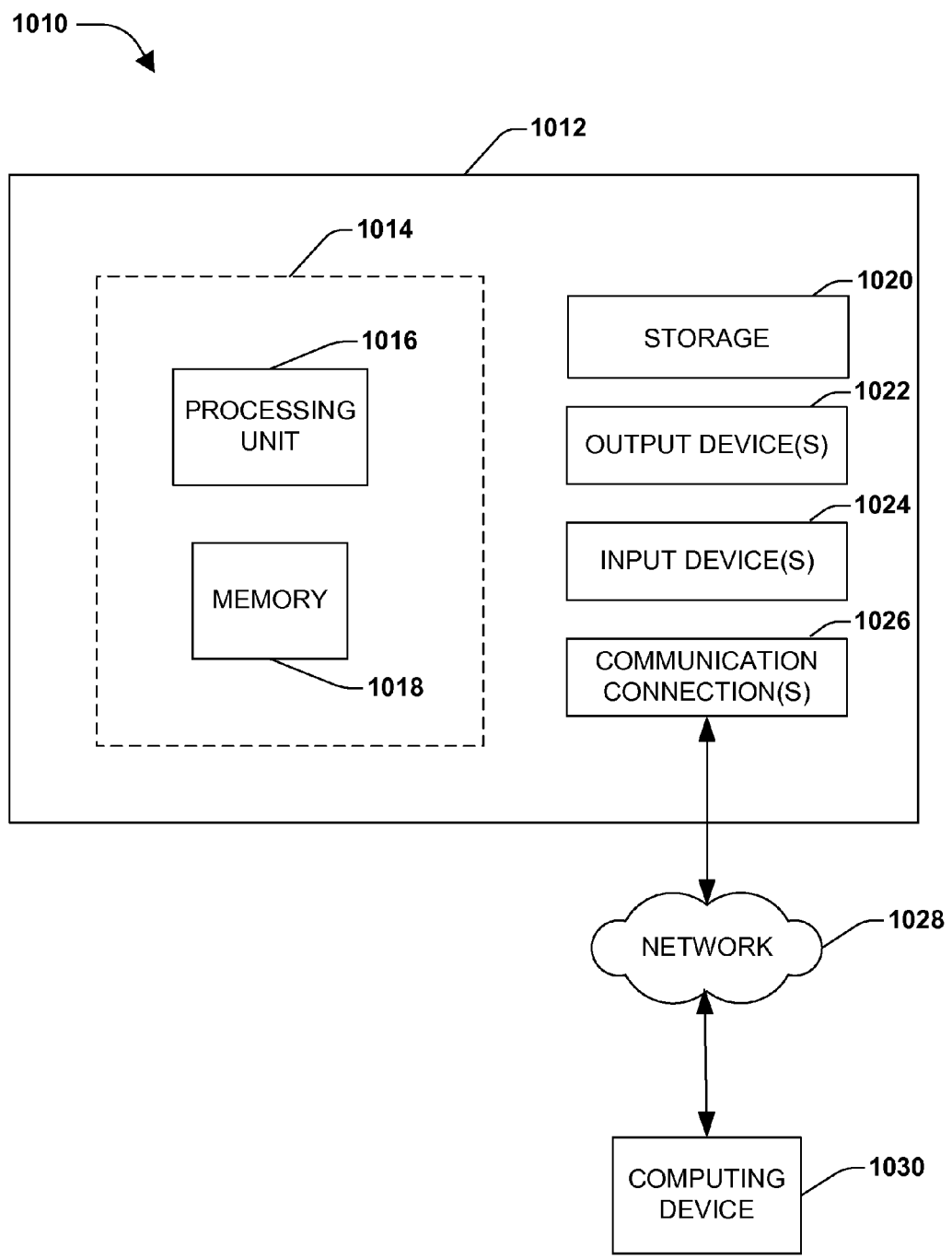
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for monitoring interactions with a projected interactive interface, comprising:
   tracking an input object and an interface object in real-time within an environment, the tracking comprising iteratively:
   identifying the input object and the interface object within the environment based upon depth maps associated with captured images of the environment;
   projecting an interactive interface onto the interface object; and
   determining whether the input object is in a hover state or a touch state in relation to at least one of the interface object or the interactive interface based upon the tracking.

2. A method for monitoring interactions between an input object and an interface object, comprising:
- receiving a depth map comprising depth data for pixels within a captured image of an environment;
- generate a depth derivative image from the depth map based upon computing depth derivatives for pixel clusters within the captured image using the depth data;
- iterating over the depth derivative image to identify an input object having depth derivative characteristics within predefined input object parameters; and
- iterating over the depth derivative image to identify an interface object having depth derivative characteristics within predefined interface object parameters, the input object distinguishable from the interface object.

3. The method of claim 2, comprising:
- tracking the input object and the interface object in real-time within the environment, the tracking comprising iteratively:
  - receiving depth maps comprising depth data for pixels within captured images of the environment;
  - generating depth derivative images from the depth maps; and
  - distinguishing between the input object and the interface object based upon depth data.

4. The method of claim 2, comprising:
- determining whether the input object is in a hover state or a touch state in relation to the interface object based upon depth data.

5. The method of claim 4, comprising at least one of:
- if the input object is in the touch state, then invoking a corresponding touch event; or
- if the input object is in the hover state, then invoking a corresponding hover event.

6. The method of claim 4, the determining whether the input object is in a hover state or a touch state comprising:
- flood filling the input object based upon depth data; and
- determining whether the flood filling filled at least a portion of the interface object.

7. The method of claim 4, comprising:
- tracking the input object while in the touch state to determine a stroke input.

8. The method of claim 2, comprising:
- projecting an interactive interface onto the interface object.

9. The method of claim 8, comprising:
- dynamically adjusting the projection of the interactive interface based upon distortion of the interface object detected from depth data associated with the interface object.

10. The method of claim 8, comprising:
- upon determining that the input object is in a touch state in relation to the interface object at a location upon which the interactive interface is projected, at least one of:
- invoking an event corresponding to the interactive interface; or
- altering the projection of the interactive interface to provide real-time feedback.

11. The method of claim 2, comprising:
- iterating over the depth derivative image to identify a second interface object; and
- determining whether the input object is in a hover state or a touch state in relation to the second interface object.

12. The method of claim 2, comprising:
- iterating over the depth derivative image to identify a second input object; and
- determining whether the second input object is in a hover state or a touch state in relation to the interface object.

13. A system for monitoring interactions between an input object and an interface object, comprising:
- a projection component configured to project an interactive interface onto an interface object; and
- a tracking component configured to:
  - track an input object and the interface object in real-time within an environment by iteratively identifying the input object and the interface object within the environment based upon depth maps associated with captured images of the environment; and
  - determine whether the input object is in a hover state or a touch state in relation to at least one of the interface object or the interactive interface based upon the tracking.

14. The system of claim 13, the environment comprising a physical environment.

15. The system of claim 13, the tracking component configured to:
- detect that the input object is in the touch state in relation to the interface object at a location upon which the interactive interface is projected; and
- alter the projection of the interactive interface to provide real-time feedback.

16. The system of claim 13, the tracking component configured to:
- generate a depth derivative image from a depth map based upon computing depth derivatives for pixel clusters within a captured image using depth data of the depth map;
- flood fill the input object within the depth derivative image based upon depth data; and
- determine whether the flood filling filled at least a portion of the interface object to determine whether the input object is in a touch state in relation to the interface object.

17. The system of claim 13, the tracking component configured to:
- detect that the input object is in a touch state in relation to the interface object at a location upon which the interactive interface is projected; and
- invoke a event corresponding to the interactive interface.

18. The system of claim 13, the tracking component configured to:
- identify the interface object based at least in part upon a user hand gesture defining an interface area.

19. The system of claim 13, the tracking component configured to:
- identify a finger as the input object based upon cylindrical depth derivative characteristics.

20. The system of claim 13, the projection component configured to:
- dynamically adjust the projection of the interactive interface based upon distortion of the interface object detected from depth data associated with the interface object.

* * * * *